Nov. 18, 1924.
A. D. SMITH
STUFFING BOX
Filed Jan. 8, 1920
1,515,816
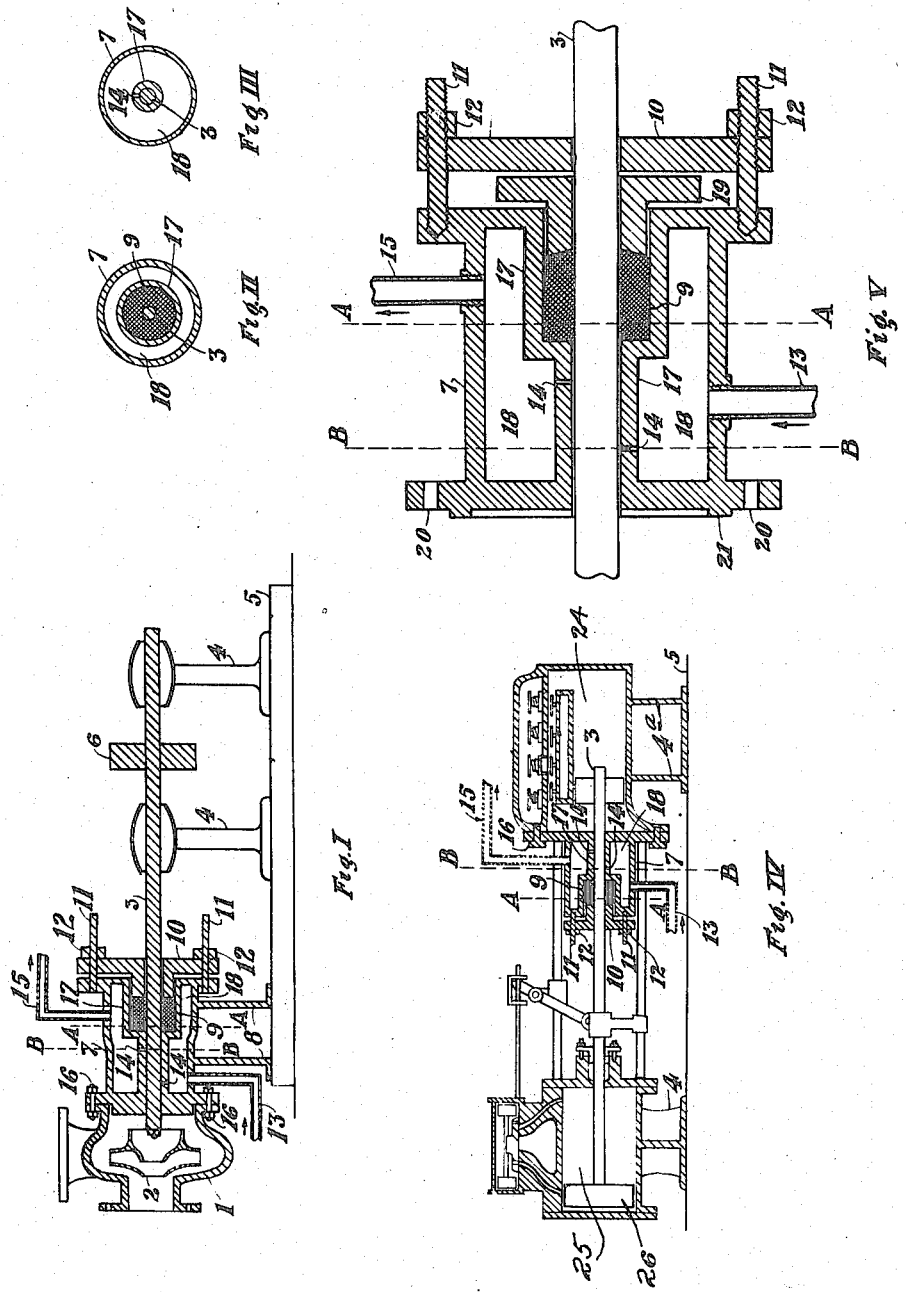

Patented Nov. 18, 1924.

1,515,816

UNITED STATES PATENT OFFICE.

ARTHUR D. SMITH, OF ARKANSAS CITY, KANSAS.

STUFFING BOX.

Application filed January 8, 1920. Serial No. 350,241.

*To all whom it may concern:*

Be it known that I, ARTHUR D. SMITH, a citizen of the United States, and a resident of Arkansas City, in the county of Cowley and State of Kansas, have invented a new and useful Improvement in Stuffing Boxes, of which the following is a specification.

This invention relates to stuffing boxes suitable for use in connection with stills or other apparatuses that are submitted to high temperature. Its principal objects are to keep the packing material reasonably cool, to guard against leakage of the contents of the still or other container and thus minimize the fire risks, and to provide for lubrication of the pump shaft, rod or other movable parts. The invention consists principally in the arrangements and combinations of parts hereinafter described and claimed; it also consists in the method hereinafter described and claimed whereby any leakage will be into the still or other container instead of out of it.

In the accompanying drawing, wherein like reference numerals designate like parts wherever they occur, Fig. I is a longitudinal sectional view of my device applied to a centrifugal pump;

Fig. II is a cross sectional view of my apparatus on the plane indicated by the dotted lines A—A in Figs. I, IV and V;

Fig. III is a cross sectional view thereof on the lines B—B in Figs. I, IV and V;

Fig. IV is a longitudinal sectional view of my apparatus applied to a reciprocating pump apparatus; and Fig. V is a longitudinal sectional detail of the stuffing box portion.

My stuffing box comprises an inner circular wall 17, offset near its middle to form a chamber for the packing, and an outer wall 7 spaced from the inner wall and joined at its ends with the inner wall, thereby forming an annular chamber 18 between them. A small passageway or passageways 14 are formed through the portion of the inner wall that has the smaller diameter so as to open directly on to the shaft or rod that works in the smaller bore thereof. Extending through the outer shell and preferably on diametrically opposite sides thereof but at opposite ends of the shell are two openings. One of these openings is connected by a pipe 13 with a pump or other means of supplying oil, water, or other cooling medium under pressure and the other opening is provided with an outlet pipe 15.

The operating shaft or rod 3 extends through the stuffing box and has an operating fit in the smaller bore thereof. The annular space between the rod and the enlarged offset portion of the inner wall of the stuffing box is filled with suitable packing 9, which is compressed endwise by means of a packing gland 19. This packing gland, in turn, is forced endwise by means of a follower 10 against which pressure is applied by means of nuts 12 that work on studbolts 11 that are mounted on one end of the stuffing box. The other end of the stuffing box is adapted to be secured directly to the shell or wall 1 of the still, pump chamber or other container. In the construction illustrated in Fig. I, this container is the shell 1 of a centrifugal pump 2 which is secured by means of bolts 16 that pass through openings 20 in the end flange of the stuffing box and through other openings in alinement therewith in a flange provided therefor on the shell of the centrifugal pump. In the construction illustrated in Fig. IV, the container is the liquid cylinder 24 of a reciprocating pump 25, to which the stuffing box is secured by bolts 16 passing through holes 20 in the flange of the stuffing box.

By the arrangement described, the stuffing box packing is kept fairly cool by the stream of cooling liquid that is kept flowing through the annular chamber thereof and between it and the still or other heated container. At the same time, the pressure of the liquid in said annular chamber is kept above the pressure of the liquid in the still or other container so that whatever leakage there may be between the stuffing box and the still will be from the stuffing box into the still and not from the still into the stuffing box. In other words, in consequence of the cooling liquid being under higher pressure than the liquid in the still, the tendency is for the cooling liquid to force its way into the still or to leak past the packing; but as the cooling liquid is either less inflammable than the still liquid or not inflammable at all, the fire risk attributable to leakage is very much reduced. When a suitable oil is used for the cooling liquid, it serves also to continuously lubricate the shaft or rod through said opening.

What I claim is:

1. The combination with a liquid container adapted for exposure to high temperature having a member extending through the wall thereof of a stuffing box for said member, said stuffing box comprising an inner wall and an outer wall spaced apart and integrally connected at their ends to form an annular chamber having an axial bore, the portion of the bore of said stuffing box adjacent to said container having a working fit with said member and the rest of the bore being enlarged to receive packing, compressible packing in said enlarged portion of the bore, and a packing gland and means for clamping it against said packing, the outer wall of said stuffing box being provided with an inlet opening and an outlet opening for the circulation of a cooling fluid through the chamber in said wall.

2. The combination with a liquid container adapted for exposure to high temperature having a member extending through the wall thereof of a stuffing box for said member, said stuffing box comprising an inner wall and an outer wall spaced apart and integrally connected at their ends to form an annular chamber having an axial bore, the portion of the bore of said stuffing box adjacent to said container having a working fit with said member and the rest of the bore being enlarged to receive packing, compressible packing in said enlarged portion of the bore, and a packing gland and means for clamping it against said packing, the outer wall of said stuffing box being provided with an inlet opening and an outlet opening on substantially opposite sides and ends for the circulation of a cooling fluid through the chamber in said wall and provided also with an opening from said chamber into the smaller bore of said stuffing box.

3. The combination with a liquid container adapted for exposure to high temperature having a member extending through the wall thereof of a stuffing box for said member, said stuffing box comprising an inner wall and an outer wall spaced apart and integrally connected at their ends to form an annular chamber having an axial bore, the portion of the bore of said stuffing box adjacent to said container having a working fit with said member and the rest of the bore being enlarged to receive packing, compressible packing in said enlarged portion of the bore, and a packing gland and means for clamping it against said packing, the outer wall of said stuffing box being provided with an inlet opening and an outlet opening for the circulation of a cooling fluid through the chamber in said wall and the inner wall being provided with an opening from said chamber into the smaller bore of said stuffing box.

Signed at Arkansas City, Kansas, this 29th day of December 1919.

ARTHUR D. SMITH.